UNITED STATES PATENT OFFICE.

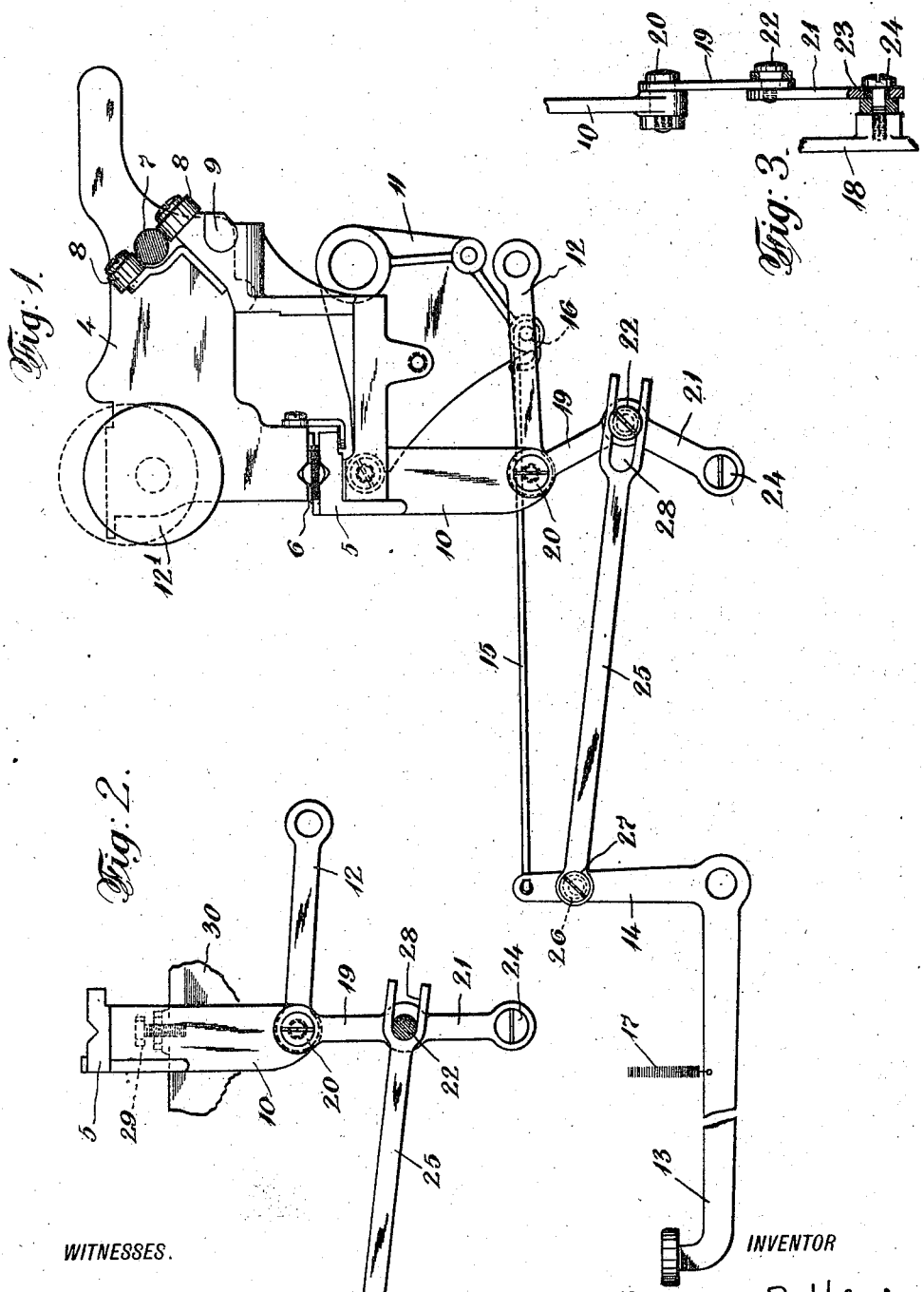

EDWARD B. HESS, OF BROOKLYN, NEW YORK, ASSIGNOR TO ROYAL TYPEWRITER COMPANY, INC., OF NEW YORK, N. Y., A CORPORATION OF NEW YORK.

CARRIAGE-SHIFT STOP FOR TYPE-WRITING MACHINES.

1,211,444.        Specification of Letters Patent.        Patented Jan. 9, 1917.

Application filed September 9, 1914. Serial No. 860,848.

*To all whom it may concern:*

Be it known that I, EDWARD B. HESS, a citizen of the United States of America, residing in the borough of Brooklyn, in the city of New York, county of Kings, and State of New York, have invented a new and useful Carriage-Shift Stop for Type-Writing Machines, of which the following is a specification.

This invention relates to means for stopping the carriage and the associated parts of a typewriting machine when shifted to upper position, the main object being to effect such stopping of the carriage as silently as possible. The carriage shift frame in this case is positively raised for upper case printing as in the Royal typewriting machine, but instead of the usual adjustable screw stops there is provided a special application of a toggle-device to the shift frame which will be hereinafter more fully described, reference being made to the accompanying drawings in which—

Figure 1 illustrates the parts of a Royal typewriting machine to which this present invention applies. Fig. 2 shows the shift frame raised with the toggle-lever stop in active position; and Fig. 3 is a front view of the toggle-lever stop partly in section.

The old parts of the machine shown consist of a carriage end frame 4, the guide-way 5 of the front lower ball bearing 6, the rear bearing rail 7, its support and guide rollers 8 carried on an extension 9 of the shift frame, the downwardly extending arm 10 of the frame, the shift frame actuating lever plate 11, parallel link 12 attached to arm 10 and the platen 12'. The shift frame and carriage supported thereby are lifted by manipulation of the bell crank shift key 13 which, by its upwardly extending short arm 14, is connected to the lower part of the lever plate 11 by a rod 15 that is formed with a slot acting on a stud 16 projecting from the side of said lever plate. A spring 17 raises the shift key 13.

Between the lower end of the arm 10 of the shift frame and part 18 of the main frame is located a toggle whose upper member 19 is, by a screw stud 20, connected to the arm 10 and whose lower member 21 is pivotally connected to part 18 of the frame. A screw stud 22 joins the two members and constitutes the central joint of the toggle. The lower member of the toggle is fitted to rock on an eccentric 23 formed on a sleeve which is securely held against part 18 of the frame by a screw 24. A bar 25 is by its forward end connected to arm 14 of shift key lever 13 by an eccentric 26 held firmly to arm 14 by a screw 27. The construction of this eccentric connection may be similar to that of the connection of the toggle member 21 to frame 18. The rear end of bar 25 has a fork, or open slotted bearing, 28 embracing stud 22 of the toggle central connection. Of course, it will be understood that the eccentric connection 23 may be applied to upper joint 20 to produce vertical adjustment. In Fig. 2 is shown one of the adjustable stops 29 upon which guide-way 5 rests when in low position, as shown at Fig. 1, for lower case printing. These stops are of usual construction, being screws seated in part 30 of the main frame and secured by lock nuts.

With the parts in normal position, as shown in Fig. 1, the depression of shift key 13 lifts the shift frame and carriage through the medium of rod 15 and lever plates 11. This causes the members 19 and 21 of the toggle to straighten out and assume the position shown at Fig. 2, and when the joints of the toggle are alined the upward movement of the carriage is arrested practically without noise, there being in the toggle system no sudden meeting or clashing of metal parts. The function of the toggle is to act as a stop for the upward movement of the shift frame and, its point of resistance being at the lower part 18 of the main frame where there is least vibration, said toggle tends also to eliminate noise. The function of bar 25 is to prevent overthrow and vibration of central joint 22 of the toggle, the arrangement being such that the stopping end of slot 28 of the bar and stud 22 of the toggle travel forwardly together and they come in contact at the same time that their movements cease, thus reducing to a minimum the impact of the blow and consequently noise produced thereby. These parts may be accurately adjusted by eccentric 26 to produce the desired effect. The eccentric 23 on which the lower member 21 of the toggle rocks provides a close adjusting means for setting the platen 12' accurately for upper case printing.

When shift key 13 is released and raised by its spring 17, bar 25 pushes the central joint of the toggle out of alinement to permit the shift frame and carriage to freely fall and, in so doing, to set the members of the toggle in angular position. The slotted connection of rod 15 with plate lever 11 allows bar 25 to act on stud 22 before lever 11 can be moved by rod 15. The parts may be so set and adjusted that the weight of the shift frame and carriage will break the straightened position of the toggle as soon as the shift key is released.

I claim:

1. In a typewriting machine, a carriage shift frame and a stop for arresting the upward movement thereof comprising a toggle pivotally connected at its upper end to the shift frame and at its lower end to the main frame of the machine in the same vertical plane as its upper pivot, a shift key lever and operating connections independent of the toggle stop between it and the shift frame, whereby the members of the toggle are moved into a right line when the shift frame is raised by the shift-key and act as a stop to limit the upward movement of the shift frame.

2. In a typewriting machine, a carriage shift frame and a stop for arresting the upward movement thereof comprising a toggle pivotally connected at its upper end to the shift frame and at its lower end to the main frame of the machine in the same vertical plane as its upper pivot, an eccentric adjusting connection at one end of the toggle, a shift key lever and operating connections independent of the toggle stop between it and the shift frame, whereby the members of the toggle are moved into a right line when the shift frame is raised by the shift-key and thus limit the upward movement of the shift frame.

3. In a typewriting machine, a carriage shift frame and a stop for arresting the upward movement thereof comprising a toggle connected to the shift frame and the main frame of the machine, a shift key lever and operating connections between it and the shift frame, a bar pivotally connected at one end to the shift key lever and having a slotted opening at the other end embracing the stud of the central connection of the toggle, whereby the members of the toggle are moved into a right line when the shift frame is raised by the shift key and thus limit the upward movement of the shift frame.

4. In a typewriting machine, a carriage shift frame and a stop for arresting the upward movement thereof comprising a toggle connected to the shift frame and the main frame of the machine, a shift key lever and operating connections between it and the shift frame, a bar having a slotted opening at one end embracing the stud of the central connection of the toggle, an eccentric connection joining the other end of the bar to the shift key lever, whereby the members of the toggle are moved into a right line when the shift frame is raised by the shift key and thus limit the upward movement of the shift frame and whereby the central joint of the toggle is moved rearwardly by the bar when the shift key is released.

5. In a typewriting machine, a carriage shift frame and a stop for arresting the upward movement thereof comprising a toggle connected to the shift frame and the main frame of the machine, an eccentric adjusting connection at one end of the toggle, a shift key lever and operating connections between it and the shift frame, a bar having a slotted opening at one end embracing the stud of the central connection of the toggle, an eccentric connection joining the other end of the bar to the shift key lever, whereby the members of the toggle are moved into a right line when the shift frame is raised by the shift key and thus limit the upward movement of the shift frame and whereby the central joint of the toggle is moved rearwardly by the bar when the shift key is released.

6. In a typewriting machine, the combination of the carriage shift frame, means for raising and lowering it vertically, a stop device for limiting the upward movement of the carriage shift frame comprising vertically arranged toggle levers pivotally connected with the carriage shift frame and with the main frame of the machine, and means operating upon said levers to prevent overthrow thereof when the carriage shift frame is raised.

7. In a typewriting machine, the combination of the carriage shift frame, a key lever, connections between said key lever and the carriage shift frame for raising and lowering it, toggle levers pivotally connected with the carriage shift frame and with the main frame of the machine and which serve to limit the upward movement of the carriage shift frame, and a rod operated by said key lever engaging the toggles and preventing overthrow thereof.

8. In a typewriting machine, the combination of a carriage shift frame, levers on which it is supported and by which it is raised and lowered, key-lever mechanism for operating said frame-supporting levers, a stop device comprising toggle levers one of which is pivotally connected with the carriage shift frame and the other with the fixed frame of the machine and which when the carriage shift frame is in its lowermost position are loose or not under strain but which when the carriage shift frame is elevated are straightened to aline with a vertical plane passing through their upper and lower pivots, and means for preventing overthrow of said toggle levers.

In testimony whereof, I have hereunto subscribed my name.

EDWARD B. HESS.

Witnesses:
　L. C. MYERS,
　GEORGE F. HANDLEY.

Copies of this patent may be obtained for five cents each, by addressing the "Commissioner of Patents, Washington, D. C."